(12) United States Patent
Tuttle

(10) Patent No.: US 8,270,911 B2
(45) Date of Patent: Sep. 18, 2012

(54) COMMUNICATIONS METHODS, METHODS OF FORMING A READER, WIRELESS COMMUNICATIONS READERS, AND WIRELESS COMMUNICATIONS SYSTEMS

(75) Inventor: John R. Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 823 days.

(21) Appl. No.: 11/712,930

(22) Filed: Feb. 28, 2007

(65) Prior Publication Data

US 2008/0207114 A1 Aug. 28, 2008

(51) Int. Cl.
*H04B 1/38* (2006.01)
(52) U.S. Cl. ........ 455/73; 455/41.2; 455/41.3; 455/415; 375/136; 375/132; 340/10.1; 340/10.2; 340/10.32; 370/445; 370/314
(58) Field of Classification Search ............... 455/41.2, 455/41.3, 415; 340/3.1, 10.1–10.3; 370/445, 370/229, 320, 335, 342
See application file for complete search history.

(56) References Cited

U.S. PATENT DOCUMENTS

| | | | |
|---|---|---|---|
| 5,051,741 A * | 9/1991 | Wesby | 340/825.49 |
| 5,649,296 A * | 7/1997 | MacLellan et al. | 455/39 |
| 5,828,693 A * | 10/1998 | Mays et al. | 375/136 |
| 5,940,006 A * | 8/1999 | MacLellan et al. | 370/314 |
| 5,940,043 A | 8/1999 | Canipe et al. | |
| 6,177,861 B1 * | 1/2001 | MacLellan et al. | 340/10.1 |
| 6,226,300 B1 * | 5/2001 | Hush et al. | 370/437 |
| 6,414,626 B1 * | 7/2002 | Greef et al. | 342/127 |
| 6,566,997 B1 | 5/2003 | Bradin | |
| 6,745,008 B1 * | 6/2004 | Carrender et al. | 455/41.1 |
| 6,952,157 B1 * | 10/2005 | Stewart et al. | 340/10.2 |
| 6,995,655 B2 | 2/2006 | Ertin et al. | |
| 7,224,712 B2 * | 5/2007 | Taki et al. | 375/132 |
| 7,362,212 B2 * | 4/2008 | Burghard et al. | 340/10.2 |
| 2002/0167397 A1 * | 11/2002 | Eroglu et al. | 340/10.6 |
| 2003/0072322 A1 * | 4/2003 | Collins et al. | 370/445 |
| 2004/0046642 A1 * | 3/2004 | Becker et al. | 340/10.32 |
| 2004/0048579 A1 * | 3/2004 | Becker et al. | 455/73 |

(Continued)

FOREIGN PATENT DOCUMENTS

JP 2006350771 A 12/2006

OTHER PUBLICATIONS

"EPC (TM) Radio-Frequency Identity Protocols Class-1 Generation-2 UHF RFID Protocol for Communications at 860 MHz-960MHz Version 1.0.9"; EPCglobal Inc; Jan. 2005; pp. 1-94.

(Continued)

*Primary Examiner* — Matthew Anderson
*Assistant Examiner* — Ganiyu Hanidu
(74) *Attorney, Agent, or Firm* — Lerner, David, Littenberg, Krumholz & Mentlik, LLP

(57) ABSTRACT

Communications methods, methods of forming a reader, wireless communications readers, and wireless communications systems are described in some embodiments. In one embodiment, a communications method includes associating a plurality of remote communications devices with a plurality of objects located within a wireless communications range of a reader having a first configuration, providing one of the remote communications device within a wireless communications range of a reader having a second configuration, wherein the wireless communications range of the reader having the second configuration is less than the wireless communications range of the reader having the first configuration, and during the presence of the one of the remote communications devices within the wireless communications range of the reader having the second configuration, implementing communications between the reader having the second configuration and only the one of the remote communications devices.

11 Claims, 1 Drawing Sheet

U.S. PATENT DOCUMENTS

| | | | |
|---|---|---|---|
| 2004/0198222 A1 | 10/2004 | Ertin et al. | |
| 2004/0201454 A1* | 10/2004 | Waterhouse et al. | 340/10.1 |
| 2005/0176414 A1* | 8/2005 | Steele et al. | 455/415 |
| 2007/0285236 A1* | 12/2007 | Batra | 340/572.1 |
| 2008/0129509 A1* | 6/2008 | Duron | 340/572.4 |
| 2008/0150695 A1* | 6/2008 | Batra | 340/10.1 |
| 2009/0121875 A1* | 5/2009 | Medve et al. | 340/10.1 |
| 2010/0253510 A1* | 10/2010 | Waterhouse et al. | 340/539.32 |
| 2011/0148591 A1* | 6/2011 | Reynolds et al. | 340/10.2 |
| 2011/0163879 A1* | 7/2011 | Kruest et al. | 340/572.7 |

OTHER PUBLICATIONS

"Security Features add to Access Control Functions"; http://giga.manufacturer.globalsources.com/gsol/l/Security-features...; Jul. 26, 2005; 3 pp.

"GAO1500 UHF Handheld Reader"; www.gaoengineering.com/index.php? main_page=product_info&cPath=63_89&prod...; 2001; 2 pp.

"Crosstalk between RFID readers"; http://instrumentation.co.za/regular.aspx? pklRegularID=2317&pklls...; 1995; 1 pp.

"Entry-level proximity tag reader"; http://security.com/news.aspx? pklNewsId=20403&pklIssueId+4...; 1995; 1 pp.

"Business Solutions—Finally! Make Millions Selling RFID"; http://72.14.203.104/search?q=cache:PRHOiVljn7Uj.www.business...; Mar. 2004; 3 pp.

Written Opinion and International Search Report for International Application No. PCT/US2008/051270, Jun. 24, 2008.

* cited by examiner

COMMUNICATIONS METHODS, METHODS OF FORMING A READER, WIRELESS COMMUNICATIONS READERS, AND WIRELESS COMMUNICATIONS SYSTEMS

TECHNICAL FIELD

The technical field is communications methods, methods of forming a reader, wireless communications readers, and wireless communications systems.

BACKGROUND

Wireless communications systems which include a plurality of communications devices are useful in various systems and applications. For example, wireless communications systems may be used in applications where identification of objects is desired. A respective wireless communications system may include a base device which communicates with one or more tags which may be associated with one or more objects to be identified.

In some wireless communications system arrangements, the number of tags used may be significant if there are numerous objects to be monitored. In addition, improvements have been made in some configurations to extend a range of the wireless communications. As a result, some configurations utilize relatively sophisticated designs to provide discrimination during identification of devices which may be communicating at the same moment in time resulting in collisions. These designs may also have other drawbacks with respect to power consumption, reliability and cost.

DETAILED DESCRIPTION OF THE ILLUSTRATED EMBODIMENTS

Figure 1:
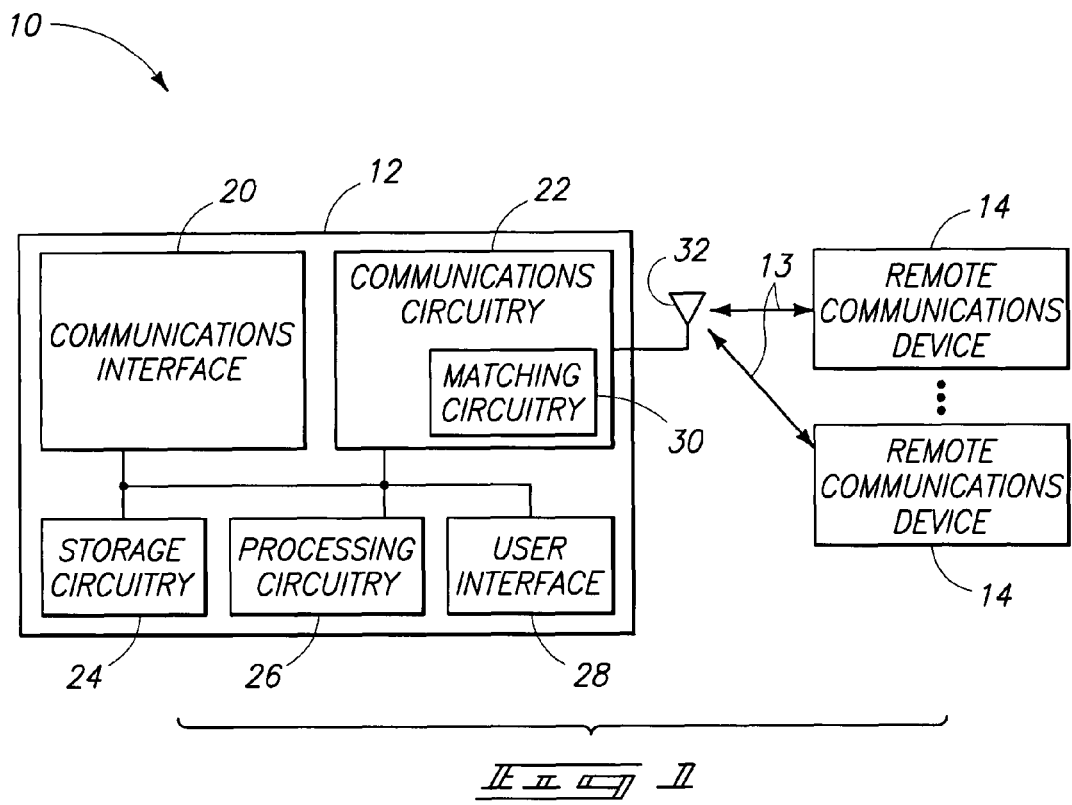
FIG. 1 is a functional block diagram of a wireless communications system according to one embodiment.

Referring to FIG. 1, a wireless communications system 10 is shown according to one embodiment. The system 10 includes a reader 12 and a plurality of remote communications devices 14. Reader 12 includes antenna 32 and is configured to implement wireless communications 13 including bi-directional communications with one or more of devices 14 in one embodiment. Remote communications devices 14 may be referred to as tags and may be associated with objects (e.g., merchandise, cargo, animals, or other articles). Wireless communications 13 may include electromagnetic signals, optical signals, or acoustic signals in some embodiments. The reader 12 and/or one or more of the remote communications devices 14 may be movable relative to one another, and accordingly, the number of remote communications devices 14 within a communications range of reader 12 may change at different moments in time. The devices 14 may be VHF, UHF or microwave devices and may communicate microwave electromagnetic signals (e.g., 915 MHz) in some embodiments.

The wireless communications 13 may include wireless signals comprising information or data to be communicated. Wireless communications system 10 is configured to implement identification operations in one embodiment. Reader 12 may output commands which are processed by respective devices 14 and which may cause devices 14 to perform one or more desired functions. In one identification embodiment, reader 12 interrogates wireless communications devices 14 wherein the reader 12 outputs an interrogation signal requesting all receiving devices 14 to respond. Remote communications devices 14 which are present within the communications range of reader 12 receive and process the outputted signal, and the respective devices 14 may formulate and communicate replies or other messages in the form of wireless signals which may include respective identifiers which uniquely identify respective ones of the remote communications devices 14. In some embodiments, objects, such as inventory items, may be associated with the devices 14 and the described identification operations may operate to additionally identify the objects as well as the devices 14. Wireless communications system 10 configured to implement identification operations may be referred to as a Radio Frequency Identification (RFID) system in one embodiment.

In one embodiment, wireless communications system 10 may utilize a plurality of readers 12 having different configurations, or a single reader 12 capable of operating in a plurality of configurations. For example, in some wireless communications embodiments, system 10 may experience collisions of signals simultaneously communicated by numerous devices 14 responding to an interrogation signal. The signal collisions may make it difficult to identify which devices 14 responded. Also, due to increased range of some reader embodiments, a user of reader 12 may not be sure which particular device 14 responds to an interrogation signal.

Accordingly, in one embodiment, readers 12 having different configurations may be used (e.g., a single reader configurable between different configurations, or a plurality of readers having different configurations). The different configurations have different associated communications ranges in one embodiment. In one configuration, reader 12 may be configured for increased range to enable communications with devices 14 present within a respective area to be monitored. In one embodiment, reader 12 of increased range may be used to communicate with plural devices 14 (and perhaps objects associated with the devices 14) located within a warehouse. The reader 12 of increased range may be configured to discriminate communications of plural devices 14 and/or implement communications at increased power levels to perform communications within the increased range.

Another configuration of reader 12 having a decreased communications range may be used at other moments in time. In one embodiment, reader 12 of decreased range is configured to communicate within an area which is less than an area associated with the communications range of the reader 12 of increased range. In one embodiment, reader 12 of increased range may communicate with devices 14 located at distances of a meter or more from reader 12, while reader 12 of decreased range may communicate with devices 14 located at distances of a few inches or less from reader 12. As described with respect to the various embodiments below, reader 12 of increased range may be referred to as an increased range reader and reader 12 of decreased range may be referred to as a decreased range reader 12. The decreased range reader 12 may be used by a user wanting to read a specific one of the devices 14, to avoid collisions with numerous devices 14 (which may also increase power consumption of such devices 14), conserve power consumption of reader 12, or for other reasons. In one embodiment, a user may use readers having the increased range and the decreased range configurations at different moments in time to communicate in the same area (e.g., warehouse) with respect to one or more of the same devices 14 present in the area.

Different configurations of decreased range readers are contemplated according to different embodiments. As discussed herein, wireless communications 13 may be utilized to implement communications between remote communications device 14 and reader 12. The devices 14 (and increased range reader 12) may be tuned to a common frequency to implement wireless communications (and the increased range reader may be referred to as a tuned reader). In one decreased range embodiment, a decreased range reader 12 may be tuned to a frequency different than the common frequency to reduce the communications range of reader 12 (and the decreased range reader may be referred to as a detuned reader). In another embodiment, a decreased range reader 12 may be configured to transmit wireless communications 13 at reduced transmit power (compared with transmission powers of increased range readers 12) to reduce the communications range of reader 12. The transmission power may be reduced by a factor of 10 or 100 in some examples of decreasing the communications range by reducing transmission power of reader 12. Other embodiments of decreased range readers 12 communicate by contact (e.g., probes in FIG. 2) with remote communications devices 14 instead of using wireless communications 13. Other configurations for providing decreased range readers 12 are contemplated in other embodiments.

Still referring to FIG. 1, the depicted embodiment of reader 12 includes a communications interface 20, communications circuitry 22, storage circuitry 24, processing circuitry 26 and a user interface 28. The depicted reader 12 may correspond to readers of one or both of the above-mentioned different configurations. Other configurations of reader 12 are possible including more, less and/or alternative components.

Communications interface 20 is arranged to implement communications of reader 12 with respect to external devices (not shown), such as a computer. Communications interface 20 may be arranged to communicate information bi-directionally with respect to external devices in one embodiment. Communications interface 20 may be implemented as a network interface card, serial or parallel connection, USB port, Firewire interface, flash memory interface, floppy disk drive, or any other suitable arrangement for communicating with respect to the external devices.

Communications circuitry 22 is configured to communicate with remote communications devices 14. In one embodiment, communications circuitry 22 includes a transceiver configured to transmit and receive wireless communications 13. In one embodiment, communications circuitry 22 is configured to modulate a carrier signal to transmit the wireless signals. Communications circuitry 22 may receive signals from devices 14 which may include backscattered signals. In one embodiment, communications circuitry 22 is configured to output continuous wave (CW) electromagnetic energy which may be backscattered by devices 14 during communication of response signals. Communications circuitry 22 includes matching circuitry 30 and antenna 32 in the depicted embodiment. Matching circuitry 30 may include a plurality of discrete components (e.g., capacitors and inductors) configured to transfer electrical energy intermediate antenna 32 and modulation or demodulation circuitry (not shown) of communications circuitry 30 in one embodiment.

The storage circuitry 24 is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 26 in one embodiment. Processor-usable media may include any one of physical media such as electronic, magnetic, optical, electromagnetic, infrared or semiconductor media. Processor-usable media include in various configurations a portable magnetic computer diskette, such as a floppy diskette, zip disk, hard drive, random access memory, read only memory, flash memory, cache memory, and/or other configurations capable of storing programming, data, or other digital information.

In one embodiment, processing circuitry 26 is arranged to process data, control data access and storage, issue commands, and control other desired operations of reader 12. Processing circuitry 26 is configured to control the generation of interrogation signals by reader 12 and to process response signals received by reader 12 in one embodiment. Processing circuitry 26 may comprise circuitry configured to implement desired programming provided by appropriate media in at least one embodiment. The processing circuitry 26 may be implemented as one or more of a processor and/or other structure configured to execute executable instructions including, for example, software and/or firmware instructions, and/or hardware circuitry. Some embodiments of processing circuitry 26 include hardware logic, PGA, FPGA, ASIC, state machines, and/or other structures alone or in combination with a processor. These examples of processing circuitry 26 are for illustration and other configurations are possible.

At least some embodiments may be implemented using programming stored within appropriate storage circuitry 24 described above and/or communicated via a network or other transmission media and configured to control appropriate processing circuitry 26. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via communications interface 20, or provided using other appropriate communication structure or medium. Programming including processor-usable code may be communicated as a data signal embodied in a carrier wave in one embodiment.

User interface 28 is configured to interact with a user including conveying data to a user (e.g., displaying data for observation by the user), as well as receiving inputs from the user (e.g., tactile input). Accordingly, in one embodiment, the user interface 28 may include a display configured to depict visual information and a keyboard or other input device. Any other suitable apparatus for interacting with a user may also be utilized. A user may exercise control over a command set using user interface 28 to implement operations of reader 12 in one embodiment.

Remote communications devices 14 may be individually associated with an object as mentioned above and may be configured to output response signals which may include identifiers configured to uniquely identify the respective communicating devices 14 (and, optionally associated objects). Remote communications devices 14 may be configured in passive arrangements wherein the devices 14 have no on-board power supplies but derive electrical energy to power circuitry of devices 14 as well as implement wireless communications (e.g., backscattered response signals) using received electromagnetic energy. Remote communications devices 14 may also be implemented in semi-passive arrangements wherein the devices 14 individually include a power source, such as a battery, configured to power circuitry of the respective device 14 while response signals are communicated using received electromagnetic energy (e.g., backscattered). Remote communications devices 14 may also be implemented in active arrangements wherein the devices 14 individually include a power source, such as a battery, configured to power circuitry of the respective device 14 as well as provide communications of response signals (e.g., modulating a carrier signal generated using an active transmitter of the respective device 14).

In one embodiment, remote communications devices 14 are configured to implement wireless communications 13 at a desired frequency which may be referred to as a communications frequency. The wireless communications 13 may include wireless signals individually utilizing a carrier signal of the respective frequency or continuous wave electromagnetic energy of the respective frequency in one embodiment. Remote communications devices 14 configured to implement communications at the desired frequency may be tuned to the respective frequency in one embodiment. In one embodiment, the remote communications devices 14 may individually comprise communications circuitry configured to resonate at the respective frequency in one embodiment (e.g., an antenna and/or modulation/demodulation circuitry of a remote communications device not shown in FIG. 1 may be configured to communicate at the respective frequency). It is desired in one embodiment to tune the remote communications devices 14 to the communications frequency being utilized to enable wireless communications 13 of increased range compared to configurations which are not tuned to the respective communications frequency.

As mentioned above, different configurations of reader(s) 12 may be used to implement desired types of communications with respect to remote communications devices 14 of the system 10. An increased range reader 12 may be tuned to the respective frequency of wireless communications 13 to provide wireless communications 13 of an increased communications range (e.g., >1 meter) compared with a communications range of a decreased range reader 12 (e.g., <1 inch) not tuned to the frequency of wireless communications 13, communicating at lower power, and/or configured in other ways to communicate at reduced ranges.

In one embodiment, communications circuitry 22 of the increased range reader 12 is tuned to resonate at the respective frequency of wireless communications 13. The antenna 32 and matching circuitry 30 (if present) of communications circuitry 22 are tuned to the respective frequency in one embodiment. In a more specific embodiment, the length of the antenna 32 may be designed according to the wavelength of the frequency of wireless communications 13 and the values of one or more discrete component of matching circuitry 30 may be selected to provide increased transfer of power intermediate antenna 32 and remaining portions of communications circuitry 22.

As mentioned above, the increased range reader 12 has a communications range covering a larger area than a communications range of a decreased range reader 12. The increased range reader 12 may simultaneously establish an electrical field coupling (with minimal or no magnetic field coupling in one embodiment) with plural devices 14 to implement wireless communications 13 in one embodiment. The decreased range readers 12 are configured to communicate at reduced wireless communication ranges or by contact. As mentioned above, decreased range readers 12 may be detuned and/or configured to communicate at reduced transmit power levels. In one detuned embodiment, a decreased range reader 12 may be detuned in various ways to establish an electrical field coupling with only one of the devices 14 at a given moment in time in one embodiment. For example, antenna 32 may be selected to not correspond to the frequency of wireless communications 13. In one embodiment, the length of the antenna 32 may be mismatched with respect to a wavelength or any integer fractional multiple of the wavelength of the frequency of the wireless communications 13. In one example, a remote communications device 14 may have a dipole antenna of approximately 3" in length (e.g., attached to a substrate of approximately 3" by 4") corresponding to the communications frequency of wireless communications 13 while antenna 32 configured as a dipole antenna in one embodiment has a length of approximately 1" or less. Other types of antenna 32, such as sub-quarter wavelength loops and patches, may be used (and configured to be inefficient if desired). In one embodiment, it is desired to detune a sensitivity of antenna 32 by 10 dB or more.

In another embodiment of implementing a decreased range reader 12 by detuning, matching circuitry 30 may be intentionally designed to provide less than maximum power transfer intermediate antenna 32 and other portions (e.g., modulation or demodulation circuitry) of communications circuitry 32. In one embodiment, inductors and/or capacitors of different values may be used to decrease efficiency of power transfer. Other embodiments of reader 12 having a detuned configuration may be used.

In one embodiment, a plurality of readers 12 having one of the increased range configuration and decreased range configuration may be provided in a given wireless communications system 10 to implement communications within respective communications ranges. In another embodiment, a single reader 12 may be configured at different moments in time "on-the-fly" between increased and decreased range configurations. In some embodiments, a user may change a configuration of matching circuitry 30 (e.g., adjusting a value of a component of circuitry 30), switch between use of a provided increased range (tuned) antenna and a different decreased range (detuned) antenna and/or change transmit power levels between respective ones of the increased and decreased range configurations at different moments in time.

In one embodiment, reader 12 having a decreased range configuration is only configured to communicate with one of the remote communications devices 14 at a given moment in time. A user may desire to use reader 12 having a reduced range configuration at certain moments in time or to perform certain operations and which may provide improved operation compared with a reader 12 having an increased range configuration. For example, the user may use reader 12 having the decreased range configuration to ensure the reader 12 is communicating with a known one of the remote communications devices 14 by placing a portable (e.g., handheld) decreased range reader 12 in close proximity to the respective individual device 14 (e.g., less than 1"). In one embodiment, the placement of reader 12 having a decreased range configuration adjacent to respective ones of the devices 14 to read the respective devices 14 at different moments in time provides manual singulation with respect to reading devices 14. Accordingly, identification of a communicating device 14 may be established without the use of arbitration or discrimination circuitry which discriminates wireless signals from multiple sources which collide. In another embodiment, devices 14 may be individually proximately placed at different moments in time adjacent to reader 12 having the decreased range configuration. The reader 12 may be reconfigured to an increased range configuration or another reader 12 having an increased range configuration may be used at another moment in time if desired to communicate with plural devices 14 of the system 10 and perhaps with respect to devices 14 spaced at increased distances relative to the increased range reader 12.

Figure 2:
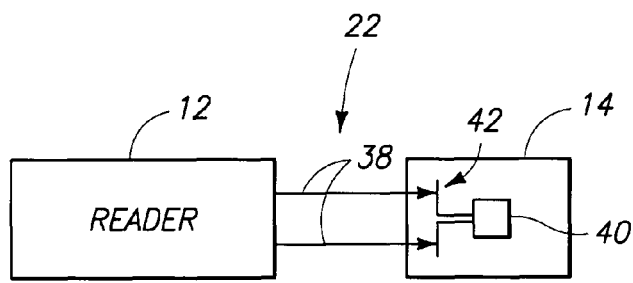
FIG. 2 is an illustrative representation of communications devices according to one embodiment.

Referring to FIG. 2, one embodiment of a decreased range reader 12 communicating with an individual one of the remote communications devices 14 is shown. The communications circuitry 22 of the illustrated reader 12 includes a probe comprising a plurality of electrical connections 38 which are configured to physically touch and establish electrical contact with conductors of a given device 14. In one embodiment, the electrical connections 38 of probe may contact respective halves of a dipole antenna 42, leads of antenna 42, pads coupled with antenna 42 (and perhaps integrated circuitry 40 of device 14 including processing circuitry and storage circuitry configured similarly to processing circuitry and communications circuitry described above in one embodiment), or other desired electrical connections of the device 14 to enable communication of electrical signals between reader 12 and device 14. Tips of electrical connections 38 may be pointed to ensure sufficient pressure contact during operation or to penetrate an electrically insulative housing material of device 14 (if present). The arrangement of reader 12 shown in FIG. 2 may be useful in applications where devices 14 are closely positioned with respect to one another or wherein the devices 14 are relatively inaccessible to an entirety of the reader 12 itself.

As described herein, at some moments in time, it may be desired to provide communications of system 10 in a range less than a wireless communications range otherwise achievable by the system 10. For example, in one access control application, it is desired to make sure that reader 12 reads a device 14 associated with a party desiring to achieve access to a secured area and not another device 14 of a different party 14 who may also be present. Decreased range communications may also be used to insure communications with one desired device 14 in the presence of many other devices 14 associated with numerous objects in inventory. Readers 12 of decreased range configurations may be desired over increased range readers 12 with respect to reduced power requirements, utilization of less sensitive receive circuitry, utilization of antennae of less efficiency, more compact size, less sophistication (e.g., no singulation, arbitration or sorting processing capabilities), increased reliability and/or reduced cost.

In compliance with the statute, the subject matter disclosed herein has been described in language more or less specific as to structural and methodical features. It is to be understood, however, that the claims are not limited to the specific features shown and described, since the means herein disclosed comprise only some of the various contemplated embodiments. The claims are thus to be afforded full scope as literally worded, and to be appropriately interpreted in accordance with the doctrine of equivalents.

Further, details herein have been presented for guidance in construction and/or operation of the disclosed embodiments. Applicant(s) hereof consider these described embodiments to also include, disclose and describe further arrangements or embodiments in addition to those explicitly disclosed. For example, the additional embodiments may include less, more and/or alternative features than those described in the specifically described embodiments. More specifically, Applicants consider the disclosure to include, disclose and describe methods which include less, more and/or alternative acts than those methods explicitly disclosed as well as apparatus which includes less, more and/or alternative structure than the explicitly disclosed structures.

I claim:

1. A communications method comprising:
   using a reader having a first configuration, outputting a first wireless interrogation signal in an area corresponding to a first wireless communications range of the reader having the first configuration;
   receiving the first wireless interrogation signal using a plurality of remote communications devices located in the first wireless communications range;
   using the reader, receiving a plurality of wireless response signals from the remote communications devices which received the first wireless interrogation signal;
   changing the reader from the first configuration to a second configuration that is different than the first configuration;
   positioning the reader having the second configuration in proximity to one of the remote communications devices located in the area, wherein the reader having the second configuration communicates within a second wireless communications range that is smaller than the first wireless communications range;
   outputting a second interrogation signal from the reader having the second configuration;
   receiving the second interrogation signal using the one of the remote communications devices; and
   after receiving the second interrogation signal and using the reader having the second configuration, receiving another response signal solely from the one of the remote communications devices and from no others of the remote communications devices located in the area.

2. The method of claim 1 wherein the positioning establishes an electrical field coupling of the reader with only the one of the remote communications devices.

3. The method of claim 1 wherein the positioning establishes electrical contact of the reader with only the one of the remote communications devices.

4. The method of claim 1 wherein the remote communications devices are tuned to a communications frequency.

5. The method of claim 4 wherein the communications frequency corresponds to a frequency of a carrier signal comprising a microwave signal.

6. The method of claim 1 wherein the outputting the first signal comprises outputting at a greater transmit power than the outputting the second signal.

7. The method of claim 1 wherein the positioning comprises positioning the reader to provide the one of the remote communications devices within the second wireless communications range.

8. The method of claim 1 wherein the receiving the first signal comprises receiving the first signal using the remote communications devices comprising tags.

9. The method of claim 1 wherein the receiving the wireless response signals comprises receiving the wireless response signals configured to identify respective ones of the remote communications devices.

10. The method of claim 1 wherein the receivings of the wireless response signals and the another response signal comprise receiving the wireless and the another response signals individually comprising backscattered signals.

11. The method of claim 1 further comprising positioning the reader in proximity to individual ones of others of the remote communications devices at other moments in time.

* * * * *